United States Patent
Park et al.

(10) Patent No.: US 9,031,707 B2
(45) Date of Patent: May 12, 2015

(54) METHOD AND SYSTEM FOR PROVIDING ENERGY MANAGEMENT IN SMART GRID ENVIRONMENT, ELECTRICAL POWER PRODUCING APPARATUS IN SMART GRID ENVIRONMENT

(75) Inventors: Wan Ki Park, Daejeon (KR); Il Woo Lee, Daejeon (KR); Chang-Sic Choi, Daejeon (KR)

(73) Assignees: Electronics and Telecommunications Research Institute, Daejeon (KR); KT Corporation, Seongnam-si, Gyeonggi-do (KR)

( * ) Notice: Subject to any disclaimer, the term of this patent is extended or adjusted under 35 U.S.C. 154(b) by 722 days.

(21) Appl. No.: 13/333,434

(22) Filed: Dec. 21, 2011

(65) Prior Publication Data

US 2012/0166001 A1    Jun. 28, 2012

(30) Foreign Application Priority Data

Dec. 23, 2010    (KR) .................. 10-2010-0133777

(51) Int. Cl.
| | |
|---|---|
| *G05B 11/01* | (2006.01) |
| *G01R 21/00* | (2006.01) |
| *G01R 11/56* | (2006.01) |
| *H02J 3/06* | (2006.01) |
| *H02J 3/14* | (2006.01) |
| *H02J 3/38* | (2006.01) |

(52) U.S. Cl.
CPC ... *H02J 3/06* (2013.01); *H02J 3/14* (2013.01); *H02J 3/38* (2013.01); *Y02B 70/3225* (2013.01); *Y04S 20/222* (2013.01); *Y04S 20/224* (2013.01)

(58) Field of Classification Search
CPC ............. H02J 3/06; H02J 9/06; H02J 13/002; H02J 13/0082; Y04S 20/222; Y04S 40/121; G06Q 50/06; Y02E 10/563; Y02E 10/763; Y02E 60/7815; H04B 3/54; H04B 2203/5433
USPC ........ 700/11, 22, 286, 291, 295, 297; 702/57, 702/60–62; 703/1, 2, 13, 14, 18; 705/63, 705/412
See application file for complete search history.

(56) References Cited

U.S. PATENT DOCUMENTS

| | | | | |
|---|---|---|---|---|
| 7,844,370 | B2 * | 11/2010 | Pollack et al. ................ | 700/291 |
| 8,321,194 | B2 * | 11/2012 | Meagher et al. ................ | 703/14 |
| 8,401,709 | B2 * | 3/2013 | Cherian et al. ................ | 700/291 |
| 8,447,435 | B1 * | 5/2013 | Miller et al. ................ | 700/297 |
| 8,487,634 | B2 * | 7/2013 | Masters et al. ................ | 324/512 |

(Continued)

FOREIGN PATENT DOCUMENTS

| | | |
|---|---|---|
| KR | 1020090118099 A | 11/2009 |
| KR | 1020100051693 A | 5/2010 |

*Primary Examiner* — Crystal J Barnes-Bullock
(74) *Attorney, Agent, or Firm* — Ladas & Parry LLP

(57) ABSTRACT

An energy management system in a smart grid environment includes: an electrical power producing apparatus for collecting and analyzing real time price information and electrical power production environment information inputted through a communication network interface to thereby determine a control of an electrical power production; a micro grid, connected to the electrical power producing apparatus, for supplying an electrical power in a local micro grid environment; an electrical power grid, connected to the micro grid, for supplying a main power; and an energy routing service apparatus for transmitting an electrical power and processing an energy information packet for a control of an electrical power flow.

7 Claims, 4 Drawing Sheets

(56) References Cited

U.S. PATENT DOCUMENTS

| | | | |
|---|---|---|---|
| 8,649,914 B2 * | 2/2014 | Miller et al. | 700/298 |
| 8,806,239 B2 * | 8/2014 | Forbes, Jr. | 713/300 |
| 8,810,192 B2 * | 8/2014 | Bridges et al. | 320/107 |
| 8,825,218 B2 * | 9/2014 | Cherian et al. | 700/295 |
| 2007/0124026 A1 * | 5/2007 | Troxell et al. | 700/291 |
| 2008/0219186 A1 | 9/2008 | Bell et al. | |
| 2008/0319893 A1 * | 12/2008 | Mashinsky et al. | 705/37 |
| 2009/0034419 A1 | 2/2009 | Flammer, III et al. | |
| 2010/0217549 A1 * | 8/2010 | Galvin et al. | 702/62 |
| 2012/0143385 A1 * | 6/2012 | Goldsmith | 700/297 |
| 2013/0204443 A1 * | 8/2013 | Steven et al. | 700/286 |
| 2014/0129040 A1 * | 5/2014 | Emadi et al. | 700/291 |
| 2014/0351010 A1 * | 11/2014 | Kong | 705/7.29 |

* cited by examiner

| PRODUCER INFORMATION | ELECTRICAL POWER QUANTITY INFORMATION | ELECTRICAL POWER QUALITY INFORMATION | CONSUMER INFORMATION |

METHOD AND SYSTEM FOR PROVIDING ENERGY MANAGEMENT IN SMART GRID ENVIRONMENT, ELECTRICAL POWER PRODUCING APPARATUS IN SMART GRID ENVIRONMENT

CROSS-REFERENCE(S) TO RELATED APPLICATION(S)

The present invention claims priority of Korean Patent Application No. 10-2010-0133777, filed on Dec. 23, 2010, which is incorporated herein by reference.

FIELD OF THE INVENTION

The present invention relates to an energy management technology in smart grid environment; and more particularly, to a method and system for providing energy management in smart grid environment and an electrical power producing apparatus in smart grid environment which are suitable for effective management of electrical power production and electrical power consumption.

BACKGROUND OF THE INVENTION

In a smart grid technology where an electrical power and communication/information technology converges, a problem of unbalance of supply and demand due to discordance between electrical power production and demand can be solved by using a method of demand/response.

A technology for demand/response consists of two types. The first type is a method by policy and the second type is a method for controlling demand of electrical power by real time price fluctuation process.

The first type is a method where a supply of electrical power is stopped according to importance of an electrical power consumer when the supply of the electrical power is not sufficient. The second type is a method for leading reduction of electrical power consumption according to ability of a consumer by setting a supply price of electrical power according to demand of electrical power in order to solve the unbalance of supply and demand.

However, in such smart grid environment of the method of demand/response, although an electrical power producer which supplies power to a specific user can supply sufficient power to the specific user, the specific user may instead have to put up with a problem of the electrical power supply shortage generated in other systems. In addition, a problem that a user has to accept a relative loss may be brought since the electrical power consumption generated by other factors is reflected in price.

SUMMARY OF THE INVENTION

In view of the above, the present invention provides an energy management technology which can provide a conversion system of power/communication/information for providing energy routing function, the energy routing function making produced electrical power to be consumed by a consumer of destination by including information for the consumer of the electrical power produced from an electrical power production step of the energy prosumer (provider+consumer) which appears newly in smart grid environment.

In accordance with a first aspect of the present invention, there is provided an energy management system in a smart grid environment, including:

an electrical power producing apparatus for collecting a real time price information and an electrical power production environment information inputted through a communication network interface, analyzing the collected the real time price information and the electrical power production environment information and determining a control of an electrical power production based on the collecting and the analyzing;

a micro grid for supplying an electrical power in a local micro grid environment, the micro grid being connected to the electrical power producing apparatus;

an electrical power grid for supplying a main power, the electrical power grid being connected to the micro grid; and an energy routing service apparatus for performing a transmission function of an electrical power and an energy information packet process function for a control of an electrical power flow.

In accordance with a second aspect of the present invention, there is provided a method for transmitting an electrical power produced in a smart grid construction based on a energy routing system, including:

analyzing a destination information of a produced electrical power by using an energy information of the produced electrical power when the energy information transmitted with the produced electrical power is received;

searching for an electrical power transmission route based on the analyzed destination information according to a protocol process based on the energy routing system;

setting the electrical power transmission route when the searching for the electrical power transmission route is completed; and transmitting the electrical power based on the electrical power transmission route.

In accordance with a third aspect of the present invention, there is provided an electrical power producing apparatus for collecting a real time price information and an electrical power production environment information inputted through a communication network interface, analyzing the collected the real time price information and the electrical power production environment information and determining a control of an electrical power production based on a collection function and an analyzing function, including:

an environment information collection and analysis function unit for collecting an environment information inputted by the communication interface and analyzing the collected environment information;

an electrical power production control unit for controlling a production of an electrical power based on a electrical power price and the environment information from the environment information collection and analysis function unit;

an electrical power prediction unit for prediction an electrical power quantity based on a control information from the electrical power production control unit and the environment information from the environment information collection and analysis function unit;

a price information process unit for determining the electrical power price and providing the electrical power production unit with the determined electrical power price;

a destination information process unit for processing a destination information based on consumer information from the environment information;

an electrical power quantity and quality sensing unit for sensing an electrical power quantity and an electrical power quality from the environment information and calculating the electrical power quantity and the electrical power quality;

a producer information process unit for processing a producer information for the environment information; and an information packet generation and transmission unit for generating an energy information packet based on the electrical power quantity and the electrical power quality from the electrical power quantity and quality sensing unit and the producer information from the producer information process unit.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

The present invention relates to a technology for constituting energy routing system function where information, for electrical power flow, transmitted and managed via communication channel with electrical power is managed and processed, and the electrical power and the information converges to be processed by controlling the flow of the electrical power based on the processed information.

Particularly, an embodiment of the present invention performs active control and management of a consumer side occurred due to unbalance of production and consumption by controlling the consumption based on production information of electrical power and manages the consumption of the electrical power according to quality and ability of electrical power production factor which the consumer chooses.

In addition, the present invention getting out of the environment where household or building consumer final end side is merely an electrical power consumer can perform function of a prosumer (provider+consumer) by providing environment where home/building or moving consumer can be an electrical power provider as an electrical power system.

Furthermore, the present invention relates to a technology which a producer can provide a desirable electrical power consumer with the electrical power and the consumer can be provided with the electrical power by a desirable producer.

The present invention can provide an energy management system in smart grid environment of convergence of electrical power and communication/information, which can provide energy routing function. The energy routing system function can provide the consumer of the destination with the produced electrical power by processing the control of the flow of the electrical power based on the information of electrical power producer, the information of the electrical power flow, the information of the consumer of the electrical power and inputted energy information.

The energy management system can check electric power destination for electrical energy including information indicating a producer and a destination and determine whether produced electrical power is consumed in a local micro grid environment according to the location of the destination or produced electrical power is supplied to other micro grid connected to an electrical power grid by supplying the produced electrical power to the electrical power grid which is a main power.

Through such energy transmission function of the electrical power energy, the producer of the electrical power and a target consumer for the electrical power can be connected.

Hereinafter, embodiments of the present invention will be described with reference to the accompanying drawings which form a part hereof.

Figure 1:
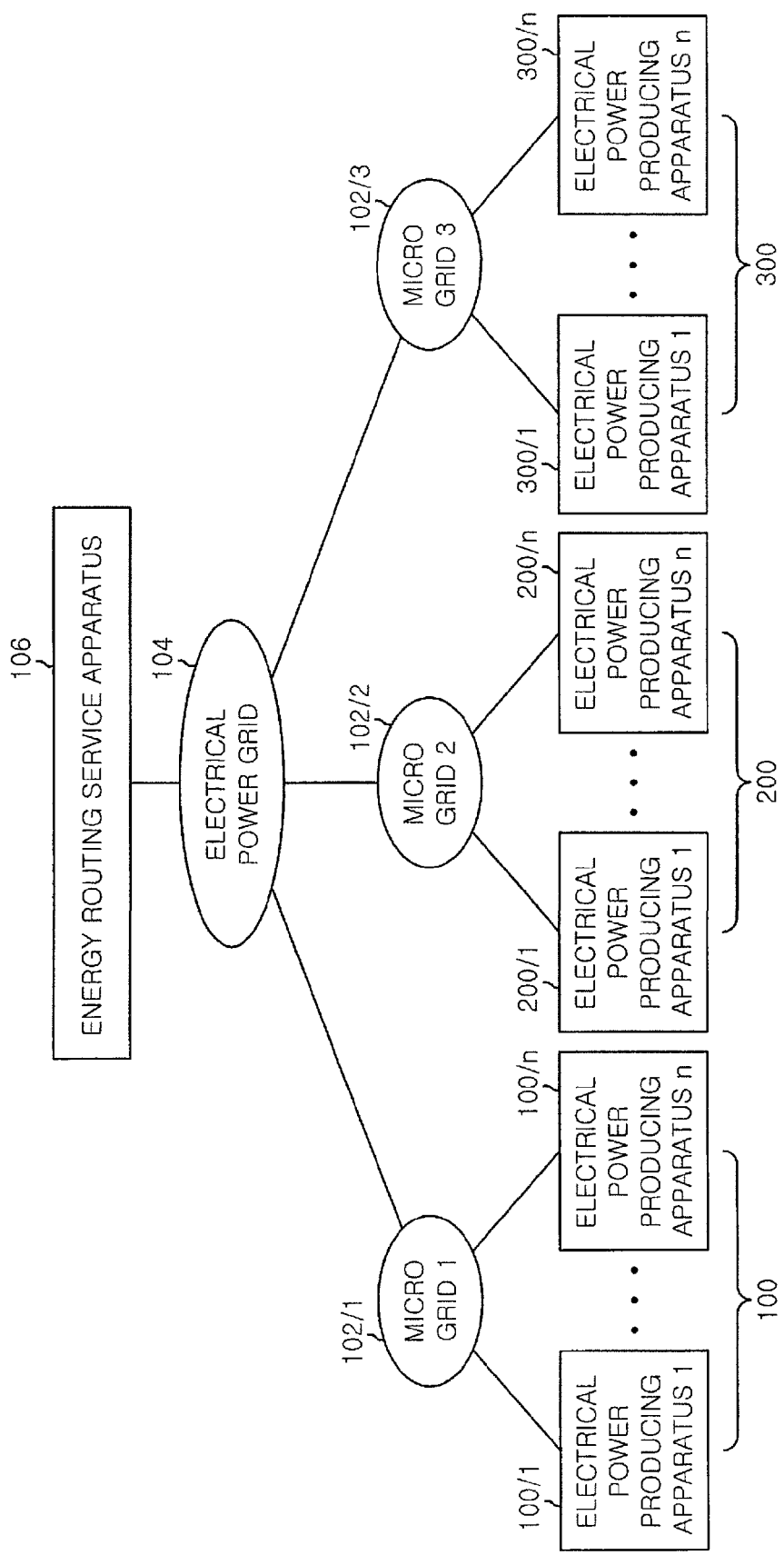
FIG. 1 shows a block diagram of an energy management system in smart grid environment in accordance with an embodiment of the present invention.

FIG. 1 shows a block diagram of an energy management system in smart grid environment in accordance with an embodiment of the present invention. The system includes electrical power producing apparatus groups 100, 200 and 300, micro grid groups 102/1 to 102/3, a power grid 104, and an energy routing service apparatus 106.

The electrical power producing apparatus groups 100, 200 and 300 as a consumer in home/building in smart grid environment can be an electrical power supplier. Namely, the electrical power producing apparatus groups can be based on an energy prosumer which is an electrical power consumer and an electrical power producer at the same time.

The electrical power producing apparatus groups 100, 200 and 300 can be classified into a first electrical power producing apparatus group 100, a second electrical power producing apparatus group 200 and a third electrical power producing apparatus group 300. Each of the first, second, third electrical power producing apparatus groups 100, 200 and 300 can be connected to a first micro grid 102/1, a second micro grid 102/2 and a third micro grid 102/3 via electrical power/communication line, respectively. Although the electrical power producing apparatus groups appears as three groups in FIG. 1, the number of the groups can be various.

The electrical power producing apparatus groups 100, 200 and 300 can collect real time price information and electrical power production environment which are inputted through communication network interface (not shown), analyze the collected the real time price information and the electrical power production environment, and plays role in determining control of electrical power production based on the functions of the collection and the analysis.

The electrical power producer can have an information input function for the produced electrical power in smart grid environment including an energy prosumer.

Figures 2, 3:
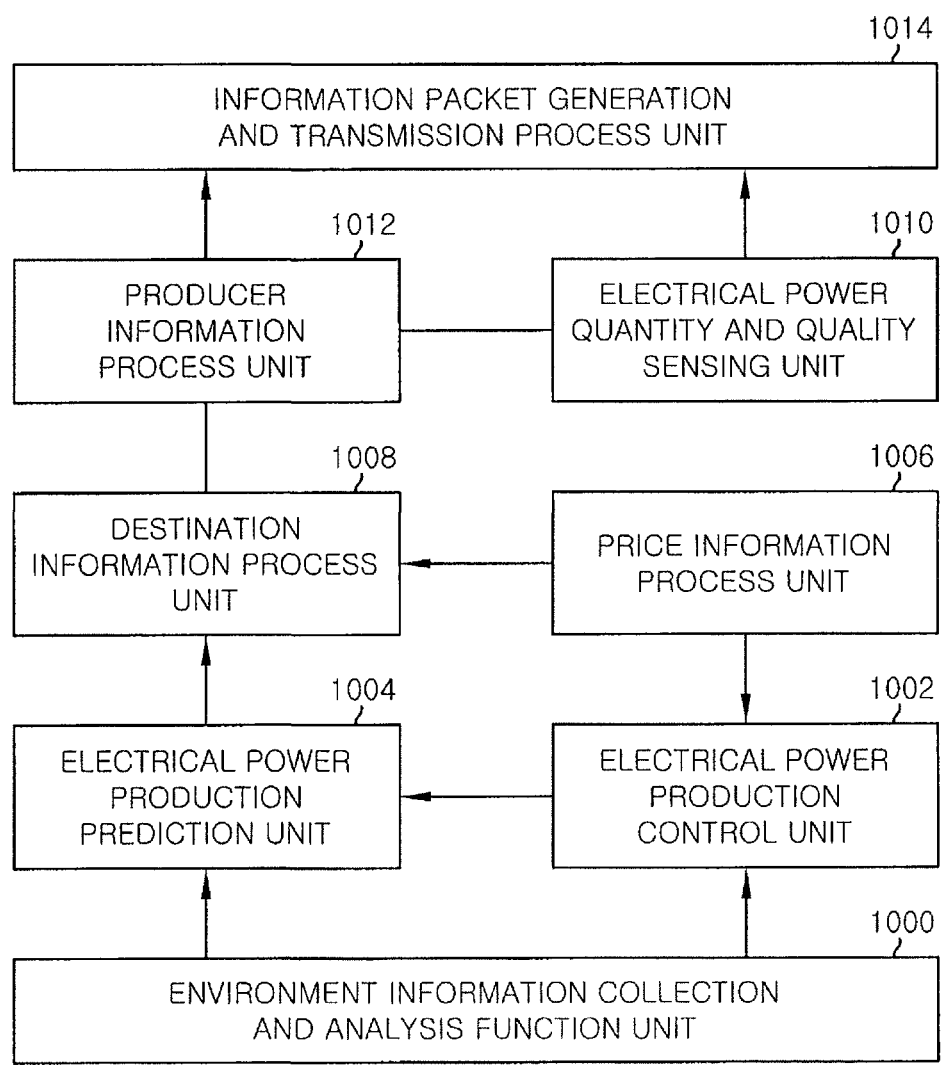
FIG. 2 illustrates an example of production information of electrical power.
FIG. 3 depicts a specific block diagram of an electrical power producing apparatus in smart grid environment in accordance with an embodiment of the present invention.

FIG. 2 illustrates an example of production information of electrical power.

As shown in FIG. 2, the produced electrical power includes a producer information (private production, public production), electrical power quantity information, and electrical power quality information and consumer information. Here, the consumer information including information for a desirable consumer, e.g., a target consumer or a public consumer can be provided to the micro grid groups 102/1 to 102/3 or electrical power grid 104 with the produced electrical power.

Referring to FIG. 1, the micro grid groups 102/1 to 102/3 means a local electrical power supply system which centers distribution power independent from the electrical power grid 104 in local micro environment and can include energy routing function.

The micro grid groups 102/1 to 102/3 are limited to a first micro grid 102/1, a second micro grid 102/2 and a third micro grid 102/3. The first, second and third micro grids can be connected to the first, second and third electrical power producing apparatus groups 100, 200 and 300, respectively via an electrical power/communication line. The number of the micro grid groups can be various.

The electrical power grid 104 as a main power grid can be connected to the micro grid groups 102/1 to 102/3 via an electrical power/communication line and include an energy routing function.

The energy routing service apparatus 106 can include the transmission function of the electrical power and information packet processing function for controlling the flow of the electrical power.

FIG. 3 depicts a specific block diagram of an electrical power producing apparatus in smart grid environment in accordance with an embodiment of the present invention, e.g., an electrical power producing apparatus 100/1 of the first electrical power producing apparatus group 1 connected to the first micro grid 102/1 among the electrical power producing apparatus groups 100, 200 and 300.

As shown in FIG. 3, the electrical power producing apparatus in accordance with the embodiment of the present invention includes an environment information collection and analysis function unit 1000, an electrical power production control unit 1002, an electrical power production prediction unit 1004, a price information process unit 1006, a destination information process unit 1008, an electrical power quantity and quality sensing unit 1010, a producer information process unit 1012 and an information packet generation and transmission process unit 1014.

The environment information collection and analysis function unit 1000 can collect environment information inputted by a communication interface and analyze the collected environment information. Here, the environment information can include, e.g., electrical power production environment information.

The electrical power production control unit 1002 can control the production of the electrical power based on the electrical power price from the following described price information process unit 1006 and the electrical power production environment information from the environment information collection and analysis function unit 1000.

The electrical power production prediction unit 1004 can predict the production quantity of the electrical power based on control information and the electrical power production environment information from the environment information collection and analysis function unit 1000.

The price information process unit 1006 can play role in determining the price of the electrical power and provide the electrical power production control unit 1002 with the determined price of the electrical power.

The destination information process unit 1008 can process the destination information based on the consumer information shown in FIG. 2.

The electrical power quantity and quality sensing unit 1010 can calculate the quantity and quality of the electrical power by sensing the electrical power quantity information and the electrical power quality information shown in FIG. 2.

The calculated quantity and quality of the electrical power can be provided to the following described information packet generation and transmission process unit 1014.

The producer information process unit 1012 can process the producer information shown in FIG. 2.

The information packet generation and transmission process unit 1014 can generate an energy information packet based on the producer information from the producer information process unit 1012 and the quantity and quality of the electrical power from the electrical power quantity and quality sensing unit 1010 and transmit the produced energy information packet with the produced electrical power to the first micro grid 102/1.

Figure 4:
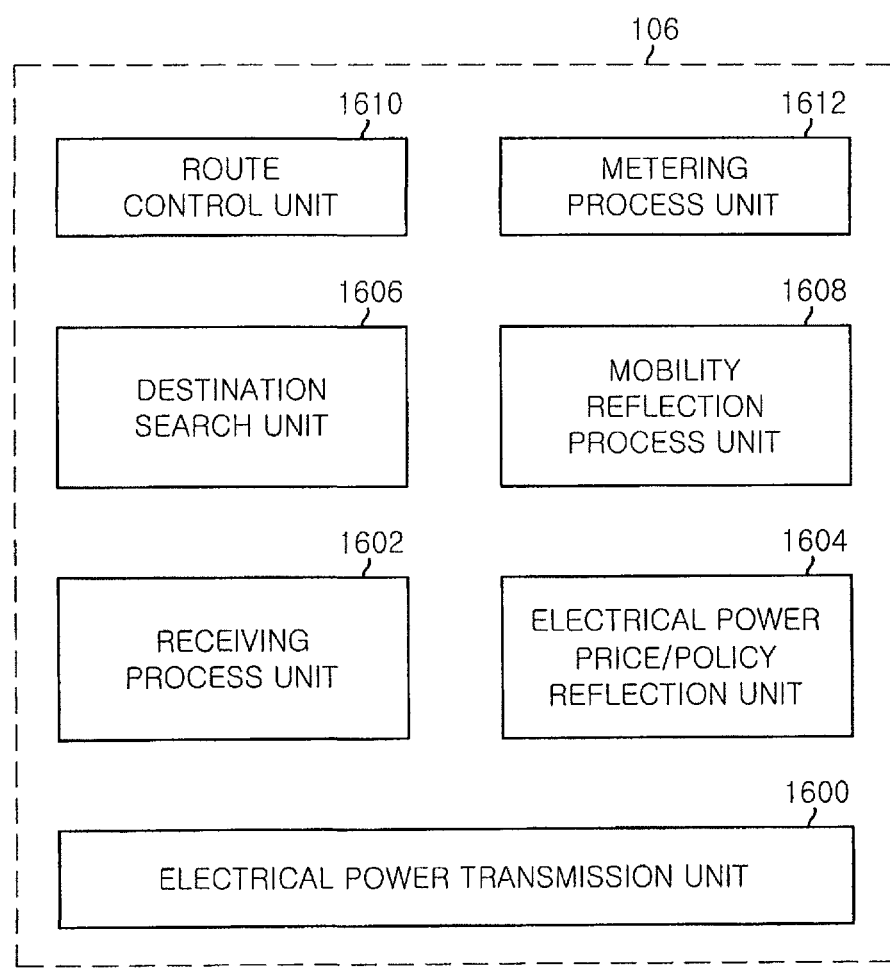
FIG. 4 shows a specific block diagram of an energy routing apparatus shown in FIG. 1.

FIG. 4 shows a specific block diagram of an energy routing apparatus 106 shown in FIG. 1. The energy routing apparatus 106 includes an electrical power transmission unit 1600, a receiving process unit 1602, an electrical power price/policy reflection unit 1604, a destination search unit 1606, a mobility reflection process unit 1608, a route control unit 1610 and a metering process unit 1612.

The energy routing service apparatus 106 can have the transmission function of the electrical power and an energy information packet process function for the control of the electrical power flow.

As shown in FIG. 4, the electrical power transmission unit 1600 can perform the transmission function of the electrical power and the receiving process unit 1602 can perform a receiving process function for the energy information packet inputted from the electrical power transmission unit 1600.

The electrical power price/policy reflection unit 1604 can perform a reflection function for the price and policy of the electrical power and the destination search unit 1606 can perform a destination search function for the destination of the electrical power transmission.

The mobility reflection unit 1608 can perform a support function for a consumer device having mobility, e.g., an electric vehicle.

The route control unit 1610 can perform a control function for the transmission route of the electrical power and the metering process unit 1612 can perform a metering function for the quantity of the electrical power transmitted via the electrical transmission unit 1600.

Meanwhile, the electrical power producing apparatus in smart grid environment as described in FIG. 3 can determine the process of the electrical power production control and the destination information according to whether the inputted price information is high or low. For example, when the price of the electrical power is low, the electrical power cannot be produced or the energy information setting the consumer as whoever can use the electrical power can be inserted.

The energy routing of the energy management system in smart grid environment in accordance with the embodiment of the present invention will be described with reference to FIG. 1.

First, the final destination of the electrical power produced based on the energy information packet inputted from the electrical power producing apparatus of an energy prosumer, e.g., the electrical power producing apparatus 1 100/1 can be determined. For this, it should be determined where the destination is located in the electrical power system.

The final destination of the produced electrical power can be a system connected to the electrical power grid 104 according to the construction thereof or the final destination of the produced electrical power can be a system which is not connected to the electrical power grid 104. For example, in case of an electric vehicle, when moving to the final destination, the electric vehicle is not connected to the electrical power grid 104. When the electric vehicle is parked and the electric vehicle is connected to a recharging system in home/building environment, the electric vehicle is connected to the electrical power grid 104.

The electrical power produced from the electrical power producing apparatus 1 100/1 can be transmitted with the producer information and the consumer information to the first micro grid 102/1.

It can be determined by the energy routing system whether the destination, i.e., the final consumer of the produced electrical power exists inside the first micro grid 102/1 or on other place based on the energy information packet.

When the final consumer exists inside the first micro grid 102/1, the destination of the electrical power produced inside the electrical power grid system of the first micro grid 102/1 can be searched for and the electrical power amounting to the produced quantity can be transmitted to the corresponding consumer.

Meanwhile, when the final electrical power consumer does not exist inside the first micro grid 102/1, the electrical power amounting to the produced quantity is transmitted from the first micro grid 102/1 to the electrical power grid 104 by using the energy routing technology.

The electrical power grid 104 can search for a micro grid including the final consumption destination and provide the corresponding micro grid with the electrical power amounting to the corresponding quantity.

For example, when the final electrical power consumer is included in the second micro grid 102/2, the electrical power grid 104 can provide the electrical power amounting to the corresponding quantity with the second micro grid 102/2.

The electrical power transmitted to the second micro grid 102/2 can be transmitted from the electrical power producer to the final electrical power consumer by the energy routing technology.

Figure 5:
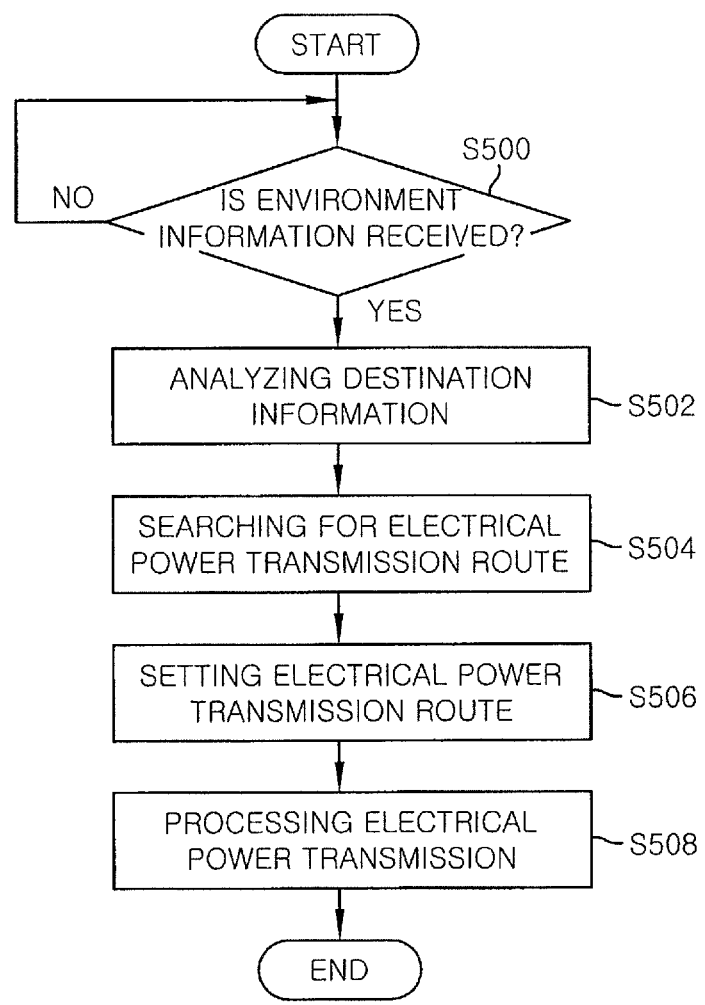
FIG. 5 illustrates a flow chart of an energy management method in smart grid environment in accordance with an embodiment of the present invention.

FIG. 5 illustrates a flow chart of an energy management method in smart grid environment in accordance with an embodiment of the present invention, particularly, a transmission process of electrical power produced in a smart grid construction based on an energy routing system.

First, the energy routing service apparatus 106 receives environment information (energy information) transmitted with produced electrical power in step S500, and analyzes destination information through the energy information of the produced electrical power in step S502.

A searching process for the transmission route of the electrical power is performed based on the analyzed destination information according to protocol process between the energy routing systems in step S504.

When the consumer is an energy consuming apparatus having mobility such as an electric vehicle, energy consuming destination can be changed. In this case, the transmission route of the electrical power can be reset by grasping the mobility for the destination.

When the search process for the transmission route of the electrical power is completed, setting process for the transmission route of the electrical power is performed in step S506 and the transmission process of the electrical power is performed based on the set transmission route of the electrical power in step S508.

In accordance with the embodiment of the present invention as described above, an energy management technology which can provide a conversion system of power/communication/information for providing energy routing function can be implemented. The energy routing function makes produced electrical power to be consumed by a consumer of destination by including information for the consumer of electrical power produced in an electrical power production step of the energy prosumer (provider+consumer) which appears newly in smart grid environment.

While the invention has been shown and described with respect to the embodiments, it will be understood by those skilled in the art that various changes and modification may be made without departing from the scope of the invention as defined in the following claims.

What is claimed is:

1. An energy management system in a smart grid environment, comprising:
    an electrical power producing apparatus for collecting real time price information and electrical power production environment information inputted through a communication network interface, analyzing the collected real time price information and the electrical power production environment information and determining a control of an electrical power production based on the collecting and the analyzing;
    a micro grid for supplying an electrical power in a local micro grid environment, the micro grid being connected to the electrical power producing apparatus;
    an electrical power grid for supplying a main power, the electrical power grid being connected to the micro grid; and
    an energy routing service apparatus for performing a transmission function of an electrical power and an energy information packet process function for a control of an electrical power flow.

2. The system of claim 1, wherein the electrical power producing apparatus is based on an energy prosumer who is an electrical power consumer and an electrical power provider at the same time in the smart grid environment.

3. The system of claim 1, wherein the electrical power producing apparatus includes an input function for information of a produced electrical power.

4. The system of claim 3, wherein the information of the produced electrical power includes producer information, electrical power quantity information, electrical power quality information and consumer information.

5. The system of claim 4, wherein the consumer information includes input information for a destination consumer and the consumer information is provided to the micro grid or the electrical power grid with the produced electrical power.

6. The system of claim 1, wherein the electrical power producing apparatus determines a process for the control of the electrical power production according to whether inputted price information is high or low.

7. The system of claim 1, wherein the energy routing service apparatus includes:
    an electrical power transmission unit for transmitting an electrical power;
    a receiving process unit for performing a receiving process of an energy information packet inputted through the electrical power transmission unit;
    an electrical price/policy reflection unit for performing a reflection process for an electrical power price and a policy;
    a destination search unit for searching for a destination for an electrical power transmission;
    a mobility reflection process unit for supporting a mobility of a consumer device having a mobility;
    a route control unit for controlling an electrical power transmission route; and
    a metering process unit for metering a quantity of an electrical power transmitted through the electrical power transmission unit.

* * * * *